US012516937B2

(12) United States Patent
Kozuma et al.

(10) Patent No.: US 12,516,937 B2
(45) Date of Patent: Jan. 6, 2026

(54) INERTIAL SENSOR

(71) Applicants: TOKYO INSTITUTE OF TECHNOLOGY, Tokyo (JP); JAPAN AVIATION ELECTRONICS INDUSTRY, LIMITED, Tokyo (JP)

(72) Inventors: Mikio Kozuma, Kanagawa (JP); Tomoya Sato, Tokyo (JP); Takuya Kawasaki, Tokyo (JP); Naoki Nishimura, Tokyo (JP); Toshiyuki Hosoya, Tokyo (JP); Atsushi Tanaka, Tokyo (JP)

(73) Assignees: Tokyo Institute of Technology, Tokyo (JP); Japan Aviation Electronics Industry, Limited, Tokyo (JP)

( * ) Notice: Subject to any disclaimer, the term of this patent is extended or adjusted under 35 U.S.C. 154(b) by 55 days.

(21) Appl. No.: 18/758,008

(22) Filed: Jun. 28, 2024

(65) Prior Publication Data
US 2025/0044099 A1 Feb. 6, 2025

(30) Foreign Application Priority Data

Aug. 2, 2023 (JP) ................. 2023-126387

(51) Int. Cl.
*G01C 21/16* (2006.01)
*G01C 19/58* (2006.01)
(Continued)

(52) U.S. Cl.
CPC ............. *G01C 21/16* (2013.01); *G01C 19/58* (2013.01); *G01C 19/721* (2013.01); *G01P 15/08* (2013.01); *G01P 15/093* (2013.01)

(58) Field of Classification Search
CPC ...... G01C 19/58; G01C 19/721; G01C 19/62; G01C 19/64; G01C 19/66; G01C 19/661;
(Continued)

(56) References Cited

U.S. PATENT DOCUMENTS 11,614,318 B2 * 3/2023 Kozuma ................ G21K 1/006
356/450
11,733,028 B2 * 8/2023 Yang ................... H01S 3/13013
372/28

(Continued)

OTHER PUBLICATIONS

Gustavson et al., "Precision Rotation Measurements with an Atom Interferometer Gyroscope", Phys. Rev. Lett.78, Mar. 17, 1997, pp. 2046-2049.
(Continued)

*Primary Examiner* — Gordon J Stock, Jr.
(74) *Attorney, Agent, or Firm* — GREENBLUM & BERNSTEIN, P.L.C.

(57) ABSTRACT

An inertial sensor includes a dual atom interferometer. A moving standing light wave generation device in the dual atom interferometer generates M ($3 \leq M$) moving standing light waves. Each of the M moving standing light waves is generated by a pair of counter-propagating laser beams. The moving standing light wave generation device adjusts two-photon detuning of a pair of counter-propagating laser beams corresponding to each of N ($2 \leq N < M$) moving standing light waves out of the M moving standing light waves such that the difference between an interferometric phase corresponding to one atomic beam obtained by interfering with the M moving standing light waves and an interferometric phase corresponding to the other atomic beam obtained by interfering with the M moving standing light waves stays constant.

3 Claims, 5 Drawing Sheets

(51) Int. Cl.
    *G01C 19/72* (2006.01)
    *G01P 15/08* (2006.01)
    *G01P 15/093* (2006.01)

(58) Field of Classification Search
    CPC ..... G01C 19/722; G01C 21/165; G01P 15/08;
        G01P 15/093; G01P 15/13; G01P 15/14;
        G01P 15/18; G01P 3/36; G01B 2290/55;
        G01B 9/02015; G01B 9/02016; G21K
        1/006; G21K 1/02; G21K 1/093; G21K
        1/025
    See application file for complete search history.

(56) References Cited

U.S. PATENT DOCUMENTS

| | | | | |
|---|---|---|---|---|
| 12,392,614 | B2* | 8/2025 | Inoue | G01P 15/093 |
| 12,424,810 | B1* | 9/2025 | Lee | H01S 3/0071 |
| 2016/0216114 | A1* | 7/2016 | Kotru | G01C 19/58 |
| 2020/0256677 | A1* | 8/2020 | Kozuma | G01C 19/58 |
| 2020/0318968 | A1* | 10/2020 | Kozuma | G01C 19/661 |
| 2020/0333139 | A1* | 10/2020 | Kozuma | G01P 15/093 |
| 2021/0233676 | A1* | 7/2021 | Inoue | G01B 9/02015 |
| 2023/0011067 | A1* | 1/2023 | Inoue | G02F 2/02 |

OTHER PUBLICATIONS

Muller et al., "A compact dual atom interferometer gyroscope based on laser-cooled rubidium", Eur. Phys. J. D 53, Jun. 2009, pp. 273-281.

* cited by examiner

INERTIAL SENSOR

TECHNICAL FIELD

The present disclosure generally relates to an inertial sensor that utilizes atom interference. More specifically, the present disclosure relates to an inertial sensor capable of suppressing deterioration in contrast of the atom interference that arises due to dispersion of velocities, in a traveling direction of an atomic beam, of atoms in the atomic beam when an angular velocity or/and acceleration is/are applied to the inertial sensor.

BACKGROUND ART

In recent years, in reaction to the advancement of laser technologies, research on atom interferometers, inertial sensors utilizing atom interference, and the like has been progressing. Known examples of atom interferometers include a Mach-Zehnder type atom interferometer and a Ramsey-Borde type atom interferometer (for example, see T. L. Gustavson, P. Bouyer and M. A. Kasevich, "Precision Rotation Measurements with an Atom Interferometer Gyroscope," Phys. Rev. Lett. 78, 2046-2049, Published 17 Mar. 1997, hereinafter referred to as Non-Patent Literature 1).

In the basic scheme of the Mach-Zehnder type atom interferometer, an atomic beam is irradiated with two moving standing light waves each called a $\pi/2$ pulse, and one moving standing light wave called a $\pi$ pulse. Due to the interaction between the atomic beam and the moving standing light waves, the atomic beam is split into two atomic beams, and furthermore the two atomic beams intersect each other, resulting in acquisition of an atomic beam according to a superposition state of an atomic state corresponding to one of the two atomic beams and an atomic state corresponding to the other atomic beam.

For example, when an angular velocity in a plane containing two atomic beams is applied to the Mach-Zehnder type atom interferometer, a phase difference occurs between the two split atomic beams, and this phase difference is reflected in the population of the atomic state corresponding to one of the two atomic beams after crossing and the population of the atomic state corresponding to the other atomic beam. Therefore, the angular velocity can be detected by observing the atomic beam according to the superposition state of the atomic state corresponding to one of the two atomic beams and the atomic state corresponding to the other atomic beam.

Further, there is also known a dual atom interferometer having a configuration in which two atomic beams traveling toward each other are irradiated with moving standing light waves (see, for example, T. L. Gustavson, P. Bouyer and M. A. Kasevich, "Precision Rotation Measurements with an Atom Interferometer Gyroscope," Phys. Rev. Lett. 78, 2046-2049, Published 17 Mar. 1997, and T. Muller, M. Gilowski, M. Zaiser, T. Wendrich, W. Ertmer, and E. M. Rasel, "A compact dual atom interferometer gyroscope based on laser-cooled rubidium," Eur. Phys. J. D 53, 273-281, 2009).

When the atomic beam is, for example, a thermal atomic beam, the velocities of atoms in the atomic beam in the traveling direction of the atomic beam follow the Maxwell-Boltzmann distribution. When the atomic beam is, for example, a cold atomic beam, it is generally known that the distribution of the velocities of atoms in the traveling direction of the cold atomic beam has a full width at half maximum of about 20% of the mode thereof. For example, when the mode of this distribution is 20 m/s, this distribution has a full width at half maximum of about ±2 m/s.

A population $P_c$ of atoms in an excited state in an atomic beam which is irradiated with a $\pi/2$ pulse, a $\pi$ pulse, and a $\pi/2$ pulse in this order is expressed by Formula (1). In this Formula (1), $\phi_1$ represents the initial phase of the first $\pi/2$ pulse, $\phi_2$ represents the initial phase of the $\pi$ pulse, $\phi_3$ represents the initial phase of the second $\pi/2$ pulse, $k_{eff}$ represents an effective wave number, $\Omega$ represents the angular velocity, and "a" represents acceleration, "v" represents the velocities of atoms in the atomic beam in the traveling direction of the atomic beam, and "L" represents the distance between the first $\pi/2$ pulse and the $\pi$ pulse (=the distance between the second $\pi/2$ pulse and the $\pi$ pulse).

$$P_e = \frac{1}{2}\left\{1 - \cos\left(\frac{2k_{eff}\Omega L^2}{v} + \frac{k_{eff}aL^2}{v^2} + \phi_1 - 2\phi_2 + \phi_3\right)\right\} \quad (1)$$

As can be seen from the Formula (1), when the velocities v of the atoms in the atomic beam in the traveling direction of the atomic beam are—that is actually the case—not the same for all the atoms, the various velocities appearing in the width of the distribution of velocities of the atoms contribute to the population $P_c$. Therefore, when an angular velocity or/and acceleration is/are applied to the atom interferometer, cosine functions having different phases cancel one another, resulting in deterioration in the contrast of the atom interference.

BRIEF SUMMARY OF THE INVENTION

Therefore, we disclose an inertial sensor capable of suppressing deterioration in contrast of atom interference that the inertial sensor utilizes, which arises due to dispersion of velocities, in a traveling direction of an atomic beam, of atoms in the atomic beam when an angular velocity or/and acceleration is/are applied to the inertial sensor.

The technical matters described herein are intended neither to limit the claimed invention either explicitly or implicitly nor to enable anyone other than those who benefit from the invention (for example, the applicant and proprietors) to limit the claimed invention, and provided solely to facilitate understanding of the gist of the invention. A summary of the invention from other aspects can be understood, for example, from the claims of this patent application as filed.

The herein-disclosed inertial sensor adopts a dual atom interferometer. The dual atom interferometer includes an interference device which a first atomic beam and a second atomic beam go in while traveling toward each other, and a moving standing light wave generation device for generating M moving standing light waves. The first atomic beam and the second atomic beam each interact with the M moving standing light waves in the interference device.

Each of the M moving standing light waves is generated by a pair of laser beams propagating in opposite directions (hereinafter referred to as "counter-propagating" laser beams). The M moving standing light waves are arranged in parallel to one another along a traveling direction of the first atomic beam (in other words, a traveling direction of the second atomic beam), and they are arranged symmetrically with respect to a straight line orthogonal to the traveling direction of the first atomic beam (in other words, the second atomic beam).

The moving standing light wave generation device adjusts a) two-photon detuning $\delta_i$ of a pair of counter-propagating laser beams corresponding to an i-th moving standing light wave out of the M moving standing light waves and b) two-photon detuning $\delta_{M-i+1}$ of the pair of counter-propagating laser beams corresponding to an (M−i+1)-th moving standing light wave out of the M moving standing light waves so as to keep constant a difference between 1) an interferometric phase corresponding to one atomic beam obtained by interaction of the first atomic beam with the M moving standing light waves and 2) an interferometric phase corresponding to the other atomic beam obtained by interaction of the second atomic beam with the M moving standing light waves, where M represents a predetermined integer satisfying 3≤M, "i" represents at least one integer among [M/2] integers satisfying 1≤N≤[M/2], the square bracket notation [ ] represents a floor function, and $\delta_i = -\delta_{M-i+1}$ is satisfied.

Furthermore, the moving standing light wave generation device may adjust two-photon detuning δ of a pair of counter-propagating laser beams corresponding to at least one of the M moving standing light waves except for the i-th moving standing light wave and the (M−i+1)-th moving standing light wave such that an extremum of the contrast of the population of the one atomic beam obtained by interaction of the first atomic beam with the M moving standing light waves is maintained or an extremum of the contrast of the population of the other atomic beam obtained by interaction of the second atomic beam with the M moving standing light waves is maintained.

These and other objects, features and advantages of the present disclosure will become apparent from the detailed description taken in conjunction with the accompanying drawings.

EFFECTS OF THE INVENTION

The herein-disclosed inertial sensor that utilizes atom interference is capable of suppressing deterioration in contrast of the atom interference which arises due to dispersion of velocities, in a traveling direction of an atomic beam, of atoms in the atomic beam when an angular velocity or/and acceleration is/are applied to the inertial sensor.

BRIEF DESCRIPTION OF THE DRAWINGS

The subject matter, which is regarded as the invention, is particularly pointed out and distinctly claimed in the claims at the conclusion of the specification. The present disclosure itself, and manner in which it may be made or used, if any, may be better understood after a review of the following description in connection with the accompanying drawings in which:

LIST OF REFERENCE NUMERALS

With regard to reference numerals used, the following numbering is used throughout the drawings.
100a: first atomic beam generation device
100b: second atomic beam generation device
1001: heater
1002: nozzle
1003: gas atom generator
1004: Laser cooler
131a: first atomic beam
131b: second atomic beam
131c: third atomic beam
131d: fourth atomic beam
200: Interference device
200a: first moving standing light wave
200b: second moving standing light wave
200c: third moving standing light wave
300: moving standing light wave generation device
311: laser light source
312: EOM
313a: optical fiber coupler
313b: optical fiber coupler
313c: optical fiber coupler
313d: optical fiber coupler
313e: optical fiber coupler
314a: VOA
314b: VOA
314c: VOA
315a: beam shaper
315b: beam shaper
315c: beam shaper
316a: beam shaper
316b: beam shaper
316c: beam shaper
320a: optical modulation device
320b: optical modulation device
320c: optical modulation device
321a: optical fiber
321b: optical fiber
321c: optical fiber
323a: frequency shifter
323b: frequency shifter
323c: frequency shifter
324a: optical fiber
324b: optical fiber
324c: optical fiber
400a: first observation device
400b: second observation device
408a: probe light
408b: probe light
409a: photodetector
409b: photodetector
500: adjuster
501a: first phase detector
501b: second phase detector
502: reference signal generator
503: phase difference detector 504: AOM adjuster
505: amplitude detector
900: inertial sensor

DETAILED DESCRIPTION

The theory of the inertial sensor disclosed herein will be described before demonstrating embodiments of the inertial sensor disclosed herein.
[Moving Standing Light Wave]

Each of M moving standing light waves, which a moving standing light wave generation device 300 described below produces, is generated by a pair of counter-propagating laser beams. "M" represents a predetermined integer satisfying 3≤M. An electric field vector E(t,r) of a pair of counter-propagating laser beams at time t and position r is expressed by Formula (2) as a superposition of plane waves. Hereinafter, one laser beam of the pair of counter-propagating laser beams will be referred to as "pump laser beam", and the other laser beam of the pair of counter-propagating laser beams will be referred to as "Stokes laser beam". $E_p$ represents an amplitude vector of the pump laser beam, $E_s$ represents an amplitude vector of the Stokes laser beam, $k_p$ represents a wavenumber vector of the pump laser beam, $k_s$ represents a wavenumber vector of the Stokes laser beam, and $\omega_p$ represents an angular frequency of the pump laser beam, $\omega_s$ represents an angular frequency of the Stokes laser beam, $\phi_p$ represents an initial phase of the pump laser beam, and $\phi_s$ represents an initial phase of the Stokes laser beam. For convenience of description, $\phi_{eff}$ is defined by Formula (3), and $k_{eff}$ is defined by Formula (4). When $|k_{eff}|$ is sufficiently small, a moving standing light wave which drifts at a velocity sufficiently smaller than the velocity of light c is generated, and $k_p/|k_p|=-k_s/|k_s|$ is satisfied. Hereinafter, in order to simplify the description, it is assumed that $E_p=E_s$ is satisfied.

$$E(t, r) = E_p \cos(k_p \cdot r - \omega_p t + \phi_p) + E_s \cos(k_s \cdot r - \omega_s t + \phi_s) \quad (2)$$

$$\phi_{eff} \equiv \phi_p - \phi_s \quad (3)$$

$$k_{eff} \equiv k_p - k_s \quad (4)$$

In a Mach-Zehnder type atom interferometer using M moving standing light waves, an atomic beam is irradiated sequentially with M moving standing light waves which are arranged in parallel to one another along the traveling direction of the atomic beam and also arranged symmetrically with respect to a straight line orthogonal to the traveling direction of the atomic beam. In particular, in the case of M=3, the optical axis of a π pulse is the axis of line-symmetry, and three moving standing light waves (i.e., a first π/2 pulse, a π pulse, and a second π/2 pulse) are arranged at equal intervals L (see FIG. 2).
[Stimulated Raman Transition]

The atom interferometer generally utilizes stimulated Raman transition. The stimulated Raman transition utilized in the atom interferometer is a transition for coupling a first transition between a state |g> and a virtual state |i> induced by the pump laser beam and a second transition between a state |e> and the virtual state |i> induced by the Stokes laser beam in the Λ-type three-level system (see FIG. 1). The energy level of the state |e> is higher than the energy level of the state |g>. The virtual state |i> is separated by only detuning Δ from a state |u> the energy level of which is higher than the energy level of the state |e>.

In the stimulated Raman transition, when the initial state of an atom is the state |g>, the atom gains a momentum of $\hbar k_p$ by absorbing a photon from the pump laser beam, but gains a momentum of $-\hbar k_s$ by emitting a photon as stimulated emission by the Stokes laser beam. In other words, the atom gains a recoil momentum of $\hbar k_{eff}$ by making transition from the state |g> to the state |e>. Conversely, the atom gains a recoil momentum of $-\hbar k_{eff}$ by making transition from the state |e> to the state |g>. As described above, one-to-one correspondence is established between the direction of transition and the recoil momentum, so that it is possible to establish one-to-one correspondence between the state and the recoil momentum, and thus express the state |g> as |g,p> and express the state |e> as |e,p+$\hbar k_e f_p$>, where h⁻ represents Dirac's constant or a value obtained by dividing Planck's constant by 2π (h⁻ represents a symbol for use in the text, and is different from the idiomatic symbol thereof), and "p" represents the momentum of the atom in the state |g>.
[Interaction Between an Atomic Beam and Moving Standing Light Waves]

When the detuning Δ is large in the stimulated Raman transition, the Λ-type three-level system can be regarded as a two-level system of the state |g> and the state |e>. Here, the interaction between an atom and a pair of counter-propagating laser beams is considered. As mentioned above, each of the two states of the atom is represented by |g,p> and |e,p+$\hbar k_{eff}$>. At this time, the wave function of the atom is expressed by Formula (5). In Formula (5), the Dirac's constant is represented by the idiomatic symbol.

$$|\phi(t)\rangle = c_g(t)|g, p\rangle + c_v(t)|e, p + \hbar k_{eff}\rangle \quad (5)$$

Figure 1:
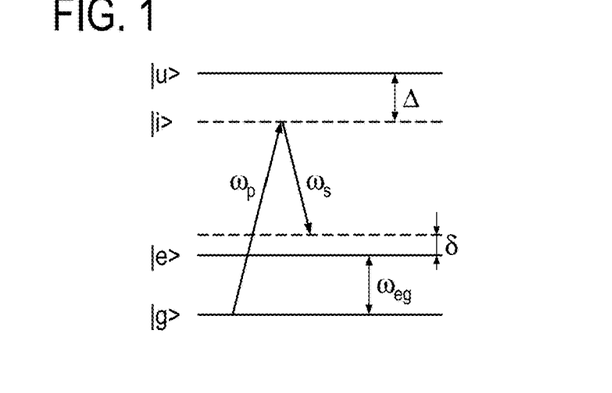
FIG. 1 shows a Λ-type three-level system.

In such a system, the atom oscillates between the state |g,p> and the state |e,p+$\hbar k_{eff}$> at the two-photon Rabi frequency $\Omega_{eg}(t)$. When the two-photon detuning δ shown in FIG. 1 is sufficiently smaller than $\Omega_{eg}(t)$, the coefficient of the wave function is expressed by Formula (6) (see Non-Patent Literature 1). In Formula (6), $t_0$ represents the start time of the interaction, and $t_1$ represents the end time of the interaction. Two-photon detuning δ is expressed by Formula (7). In Formula (7), "m" represents the mass of one atom, and $\omega_{eg}$ represents the frequency corresponding to the transition between the energy level of the state |e> and the energy level of the state |g>.

$$\begin{pmatrix} c_e(t_1) \\ c_g(t_1) \end{pmatrix} = \begin{pmatrix} \cos\left(\frac{1}{2}\theta\right) & -i\sin\left(\frac{1}{2}\theta\right)e^{i(\delta t_0 + \phi_{eff})} \\ -i\sin\left(\frac{1}{2}\theta\right)e^{i(\delta t_0 + \phi_{eff})} & \cos\left(\frac{1}{2}\theta\right) \end{pmatrix} \begin{pmatrix} c_e(t_0) \\ c_g(t_0) \end{pmatrix} \quad (6)$$

$$\theta = \int_{t_0}^{t_1} \Omega_{eg}(t')dt'$$

$$\delta = \omega_p - \omega_s - \left(\omega_{eg} + \frac{p \cdot k_{eff}}{m} + \frac{\hbar|k_{eff}|^2}{2m}\right) \quad (7)$$

In the case of θ=π/2, the coefficient of the wave function is expressed by Formula (8). The moving standing light wave in the case of θ=π/2 is a π/2 pulse.

$$\begin{pmatrix} c_e(t_1) \\ c_g(t_1) \end{pmatrix} = \frac{1}{\sqrt{2}} \begin{pmatrix} 1 & -ie^{-i(\delta t_0 + \phi_{eff})} \\ -ie^{i(\delta t_0 + \phi_{eff})} & 1 \end{pmatrix} \begin{pmatrix} c_e(t_0) \\ c_g(t_0) \end{pmatrix} \quad (8)$$

In the case of θ=π, the coefficient of the wave function is expressed by formula (9). The moving standing light wave in the case of θ=π is a π pulse.

$$\begin{pmatrix} c_e(t_1) \\ c_g(t_1) \end{pmatrix} = \begin{pmatrix} 0 & -ie^{-i(\delta t_0 + \phi_{\mathit{eff}})} \\ -ie^{i(\delta t_0 + \phi_{\mathit{eff}})} & 0 \end{pmatrix} \begin{pmatrix} c_e(t_0) \\ c_g(t_0) \end{pmatrix} \quad (9)$$

When each laser beam constituting the pair of counter-propagating laser beams for generating the moving standing light wave is a Gaussian beam, the two-photon Rabi frequency $\Omega_{eg}(t)$ is expressed by Formula (10), where $\sigma_t$ represents an interaction time width and $\sigma_t$=w/(2|v|) holds, "v" represents a velocity vector of an atom in the atomic beam in the traveling direction of the atomic beam, and "w" represents the width of the moving standing light wave, specifically, a beam waist of the Gaussian beam (which is, for example, $1/(e^2)$ width). Therefore, for the π pulse, $\pi/\Omega_{0,\pi}=\sqrt{(\pi/2)}w_\pi/|v|$, that is, $\pi|v|=\sqrt{(\pi/2)}w_\pi\Omega_{0,\pi}$ is satisfied, and for the π/2 pulse, $\pi/(2\Omega_{0,\pi/2})=\sqrt{(\pi/2)}w_{\pi/2}/|v|$, that is, $\pi|v|=2\sqrt{(\pi/2)}w_{\pi/2}\Omega_{0,\pi/2}$ is satisfied. For example, if the width $w_\pi$ of the π pulse is set to be equal to the width $w_{\pi/2}$ of the π/2 pulse, the Rabi frequency $\Omega_{0,\pi}$ of the π pulse will be set to be twice the Rabi frequency $\Omega_{0,\pi/2}$ of the π/2 pulse. In this case, because the Rabi frequency is proportional to the intensity of laser beam, the intensity of each laser beam constituting a pair of counter-propagating laser beams for generating a π pulse is twice the intensity of each laser beam constituting a pair of counter-propagating laser beams for generating a π/2 pulse. In general, atoms in an atomic beam range in velocity in the traveling direction of the atomic beam. Therefore, when $\pi|v_0|=2\sqrt{(\pi/2)}w_\pi\Omega_{0,\pi}$ is satisfied for an atom having a velocity $|v_0|$, $\pi|v_x|=2\sqrt{(\pi/2)}w_\pi\Omega_{0,\pi}$ is not satisfied for an atom having different velocity $|v_x|$. Therefore, in order to design moving standing light waves, the velocities of atoms must be specified in advance. A designer can freely determine the velocities of atoms as a premise for designing moving standing light waves, but from the perspective of visibility of an observed atomic beam, the mode or average value of distribution of velocities of atoms in the traveling direction of the atomic beam is usually selected as the characteristic velocity of the atoms for the design of the moving standing light waves. In the following description, unless otherwise specified, |v| represents velocities of atoms within a relatively narrow range—hereinafter referred to a velocity range—around and including the mode of the distribution of the velocities of the atoms in the traveling direction of the atomic beam, and "v" represents the velocity vectors of the atoms. It may be considered that the moving standing light wave functions as neither a π/2 pulse nor a π pulse for atoms having velocities which are not within the above-mentioned velocity range.

$$\Omega_{eg}(t) = \Omega_0 \exp\left(-\frac{t^2}{2\sigma_t^2}\right) \quad (10)$$

Figure 2:
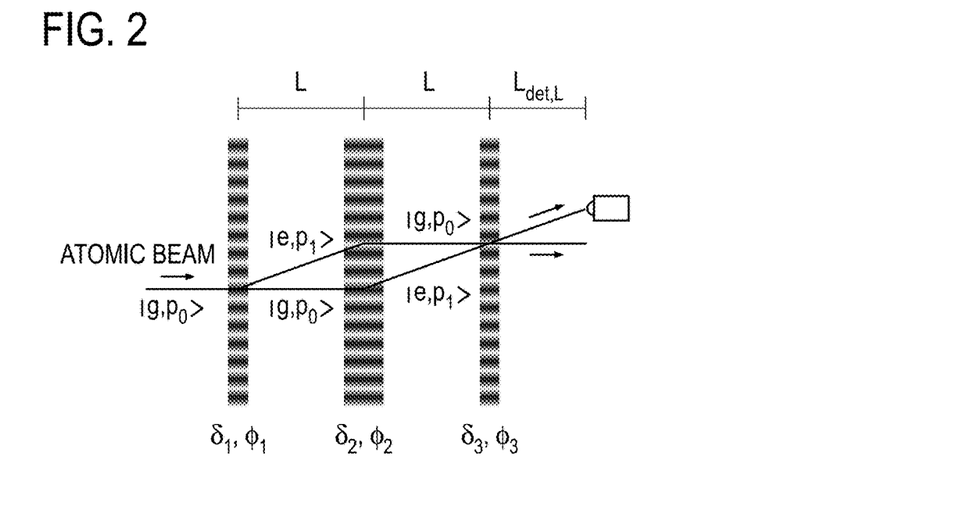
FIG. 2 shows a basic scheme of a Mach-Zehnder type atom interferometer.

The atom interferometer is generally sensitive to an angular velocity and acceleration. Hereinafter, in order to simplify the description, consideration is given to a case for M=3. In a Mach-Zehnder type atom interferometer using three moving standing light waves, as shown in FIG. 2, an atomic beam is irradiated with a first π/2 pulse, a π pulse and a second π/2 pulse in this order, the first π/2 pulse, the π pulse and the second π/2 pulse being arranged at equal intervals L in the traveling direction of the atomic beam. Therefore, the coefficients ($c_e$, $c_g$) of the wave function of an atom immediately after the second π/2 pulse are expressed by Formula (11). In Formula (11), $\delta_1$ represents the two-photon detuning δ of the first π/2 pulse, $\delta_2$ represents the two-photon detuning δ of the π pulse, $\delta_3$ represents the two-photon detuning δ of the second π/2 pulse, $\phi_1$ represents $\phi_{\mathit{eff}}$ of the first π/2 pulse, $\phi_2$ represents the $\phi_{\mathit{eff}}$ of the π pulse, $\phi_3$ represents $\phi_{\mathit{eff}}$ of the second π/2 pulse, α(t) represents a phase shift caused by an angular velocity vector Ω, and β(t) represents a phase shift caused by an acceleration vector a. In Formula (11), T=L/|v| holds. The effective wave number vectors $k_{\mathit{eff}}$ (see Formula (4)) of the three moving standing light waves are equal to each other.

$$\begin{pmatrix} c_e \\ c_g \end{pmatrix} = \frac{1}{\sqrt{2}} \begin{pmatrix} 1 & -ie^{-i(\delta_3 t_2 + \alpha(t_2) + \beta(t_2) + \phi_3)} \\ -ie^{i(\delta_3 t_2 + \alpha(t_2) + \beta(t_2) + \phi_3)} & 1 \end{pmatrix} \times$$
$$\begin{pmatrix} 0 & -ie^{-i(\delta_2 t_1 + \alpha(t_1) + \beta(t_1) + \phi_2)} \\ -ie^{i(\delta_2 t_1 + \alpha(t_1) + \beta(t_1) + \phi_2)} & 0 \end{pmatrix} \times$$
$$\frac{1}{\sqrt{2}} \begin{pmatrix} 1 & -ie^{-i(\delta_1 t_0 + \alpha(t_0) + \beta(t_0) + \phi_1)} \\ -ie^{i(\delta_1 t_0 + \alpha(t_0) + \beta(t_0) + \phi_1)} & 1 \end{pmatrix} \begin{pmatrix} c_e(t_0) \\ c_g(t_0) \end{pmatrix} \quad (11)$$

$$t_2 := t_0 + 2T$$
$$t_1 := t_0 + T$$
$$\alpha(t) = k_{\mathit{eff}} \cdot (\Omega \times (r_{ini} + vt))t$$
$$\beta(t) = k_{\mathit{eff}} \cdot \left(\frac{1}{2}at^2 + vt + r_{ini}\right)$$

When the initial state of the atom is $|g,p\rangle$, ($c_e(t_0)$, $c_g(t_0)$)=(0,1) is satisfied, so that the population $P_c$ of atoms in the state $|e,p+\hbar k_{\mathit{eff}}\rangle$ in an atomic beam after irradiation with the first π/2 pulse, the π pulse, and the second π/2 pulse in this order is expressed by Formula (12).

$$P_e = |c_e|^2 \quad (12)$$
$$= \left| \frac{1}{\sqrt{2}} \times -ie^{-i(\delta_2 t_1 + \alpha(t_1) + \beta(t_1) + \phi_2)} \times \frac{1}{\sqrt{2}} + \right.$$
$$\left. \frac{-i}{\sqrt{2}} e^{-i(\delta_1 t_0 + \alpha(t_0) + \beta(t_0) + \phi_1)} \times -ie^{i(\delta_2 t_1 + \alpha(t_1) + \beta(t_1) + \phi_2)} \times \frac{-i}{\sqrt{2}} e^{-i(\delta_3 t_2 + \alpha(t_2) + \beta(t_2) + \phi_3)} \right|^2$$
$$= \frac{1}{2}\{1 - \cos(\delta_1 t_0 - 2\delta_2(t_0 + T) + \delta_3(t_0 + 2T) +$$
$$\phi_1 - 2\phi_2 + \phi_3 + 2k_{\mathit{eff}} \cdot (\Omega \times v)T^2 + k_{\mathit{eff}} \cdot aT^2)\}$$

Further, the population $P_g$ of atoms in the state |g,p⟩ in the atomic beam after irradiation with the first π/2 pulse, the π pulse, and the second π/2 pulse in this order is expressed by $P_g = 1 - P_c$.

Hereinafter, for convenience of description, the phase of the cosine function in the formula representing the population $P_c$ is expressed by Φ, the above-mentioned atomic beam is referred to as "first atomic beam", and the subscript Φ is appended to the symbol related to the first atomic beam. The phase Φ is occasionally called an "interferometric phase" in view of atom interference in closed two-paths that arise due to split of an atomic beam and recombination thereof resulting from interaction of the atomic beam with some moving standing light waves. Thus, the phase Φ is hereafter referred to as the interferometric phase Φ. When the first atomic beam after irradiation with the first π/2 pulse, the π pulse, and the second π/2 pulse in this order is observed at time t, the interferometric phase $\Phi_L$ is expressed by Formula (13). In Formula (13), $T_L = L/|v_L|$ and $T_{det,L} = L_{det,L}/|v_L|$ hold. $L_{det,L}$ represents the distance between the second π/2 pulse and a photodetector 409a described later. $|v_L|$ represents the velocities of the atoms in the first atomic beam in the traveling direction of the first atomic beam.

$$\Phi_L = \delta_1(t - 2T_L - T_{det,L}) - 2\delta_2(t - T_L - T_{det,L}) + \delta_3(t - T_{det,L}) + \quad (13)$$

$$\phi_1 - 2\phi_2 + \phi_3 + 2k_{eff} \cdot (\Omega \times v_L)T_L^2 + k_{eff} \cdot aT_L^2$$

$$= (\delta_1 + \delta_3)\left(t - \frac{L_{det,L}}{|v_L|}\right) + 2\delta_2 \frac{L + L_{det,L}}{|v_L|} + k_{eff} \cdot a\left(\frac{L}{|v_L|}\right)^2 -$$

$$2\left(\delta_1 - k_{eff} \cdot \left(\Omega \times \frac{v_L}{|v_L|}\right)L\right)\frac{L}{|v_L|} + \phi_1 - 2\phi_2 + \phi_3 - 2\delta_2 t$$

When we consider a case where the magnitude of the acceleration vector a and the two-photon detuning $\delta_2$ in Formula (13) are sufficiently small, Formula (13) can be rewritten into Formula (14).

$$\Phi_L \approx (\delta_1 + \delta_3)\left(t - \frac{L_{det,L}}{|v_L|}\right) - \quad (14)$$

$$2\left(\delta_1 - k_{eff} \cdot \left(\Omega \times \frac{v_L}{|v_L|}\right)L\right)\frac{L}{|v_L|} + \phi_1 - 2\phi_2 + \phi_3 - 2\delta_2 t$$

In Formula (14), in order for the interferometric phase $\Phi_L$ to be independent of the velocities $|v_L|$ of the atoms in the first atomic beam in the traveling direction of the first atomic beam, it is only necessary that $\delta_3 = -\delta_1$ and Formula (15) are satisfied. The two-photon detuning $\delta_1$ of the first π/2 pulse is set to the value in Formula (15), the two-photon detuning $\delta_2$ of the π pulse is set to a sufficiently small value (ideally $\delta_2 = 0$), and the two-photon detuning $\delta_3$ of the second π/2 pulse is set to the value of $-\delta_1$, whereby the interferometric phase $\Phi_L$ is expressed by Formula (16). Therefore, it can be seen that the interferometric phase $\Phi_L$ is not affected by the velocities $|v_L|$ of the atoms in the first atomic beam in the traveling direction of the first atomic beam.

$$\delta_1 = k_{eff} \cdot \left(\Omega \times \frac{v_L}{|v_L|}\right)L \quad (15)$$

$$\Phi_L = \phi_1 - 2\phi_2 + \phi_3 - 2\delta_2 t \quad (16)$$

However, since the right side of Formula (15) includes the angular velocity vector Ω as a detection target, it is impossible to directly set the values of $\delta_1$ and $\delta_3$ (=$-\delta_1$). Therefore, we consider adjusting the interferometric phase.

Figure 3:
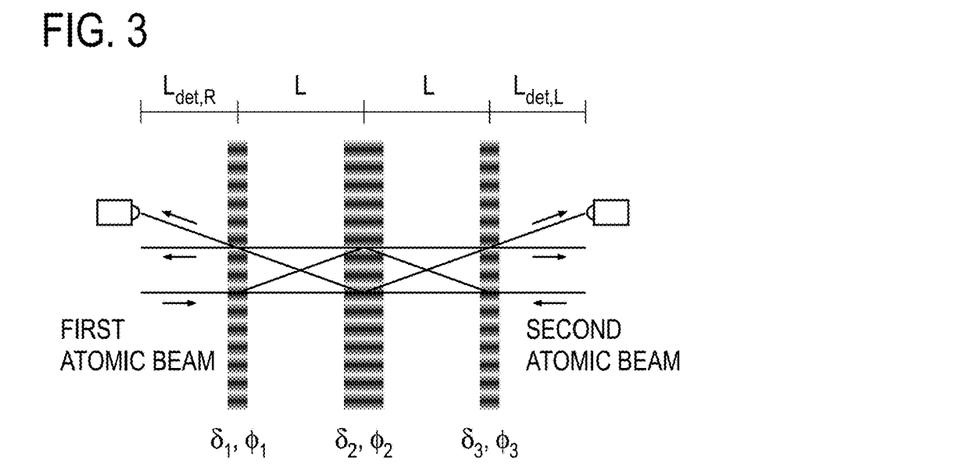
FIG. 3 shows a basic scheme of a dual atom interferometer.

For adjustment of the interferometric phase, we adopt a dual atom interferometer shown in FIG. 3. One of two atomic beams that enter the dual atom interferometer and travel toward each other is referred to as a first atomic beam, and the other atomic beam is referred to as a second atomic beam. The foregoing description on the first atomic beam holds true for the first atomic beam in the dual atom interferometer. With appending the subscript R to the symbol related to the second atomic beam, Formula (17) holds for the second atomic beam similarly to the foregoing description. In Formula (17), $v_L/|v_L| = -v_R/|v_R|$ is used.

$$\Phi_R = \delta_1(t - T_{det,R}) - 2\delta_2(t - T_R - T_{det,R}) + \delta_3(t - 2T_R - T_{det,R}) + \quad (17)$$

$$\phi_1 - 2\phi_2 + \phi_3 + 2k_{eff} \cdot (\Omega \times v_R)T_R^2 + k_{eff} \cdot aT_R^2$$

$$= (\delta_1 + \delta_3)\left(t - \frac{L_{det,R}}{|v_R|}\right) + 2\delta_2 \frac{L + L_{det,R}}{|v_R|} + k_{eff} \cdot a\left(\frac{L}{|v_R|}\right)^2 +$$

$$2\left(-\delta_3 + k_{eff} \cdot \left(\Omega \times \frac{v_R}{|v_R|}\right)L\right)\frac{L}{|v_R|} + \phi_1 - 2\phi_2 + \phi_3 - 2\delta_2 t$$

$$\approx (\delta_1 + \delta_3)\left(t - \frac{L_{det,R}}{|v_R|}\right) +$$

$$2\left(-\delta_3 + k_{eff} \cdot \left(\Omega \times \frac{v_R}{|v_R|}\right)L\right)\frac{L}{|v_R|} + \phi_1 - 2\phi_2 + \phi_3 - 2\delta_2 t$$

$$= (\delta_1 + \delta_3)\left(t - \frac{L_{det,R}}{|v_R|}\right) +$$

$$2\left(-\delta_3 - k_{eff} \cdot \left(\Omega \times \frac{v_L}{|v_L|}\right)L\right)\frac{L}{|v_R|} + \phi_1 - 2\phi_2 + \phi_3 - 2\delta_2 t$$

In Formula (17), in order for the interferometric phase $\Phi_R$ to be independent of the velocities $|v_R|$ of the atoms in the second atomic beam in the traveling direction of the second atomic beam, it is necessary only that $\delta_3 = -\delta_1$ and Formula (15) are satisfied similarly to the above-mentioned condition regarding the interferometric phase $\Phi_L$. The two-photon detuning $\delta_1$ of the first π/2 pulse is set to the value in Formula (15), the two-photon detuning $\delta_2$ of the π pulse is set to a sufficiently small value (ideally $\delta_2 = 0$), and the two-photon detuning $\delta_3$ of the second π/2 pulse is set to the value of $-\delta_1$, whereby the interferometric phase $\Phi_R$ is expressed by Formula (18). Therefore, it can be seen that the interferometric phase $\Phi_R$ is not affected by the velocities $|v_R|$ of the atoms in the second atomic beam in the traveling direction of the second atomic beam.

$$\Phi_R = \phi_1 - 2\phi_2 + \phi_3 - 2\delta_2 t \quad (18)$$

When $\delta_3 = -\delta_1$ and Formula (15) are satisfied, $\Phi_L = \Phi_R$ holds as is clear from Formula (16) and Formula (18). Conversely, in a situation where $\Phi_L = \Phi_R$ is satisfied under the condition of $\delta_3 = -\delta_1$, Formula (15) is satisfied. In fact, as is clear from Formulas (14) and (17), $\Phi_L - \Phi_R = 0$ is satisfied regardless of the time and the atomic velocity if and only if Formula (15) is satisfied and $\delta_3 = -\delta_1$. When $\Phi_L = \Phi_R$ is satisfied under the condition of $\delta_3 = -\delta_1$, the z-direction component $|\Omega_z|$ of the angular velocity vector Ω is expressed by Formula (19). The z-direction is a direction which is orthogonal to the effective wave number vector $k_{eff}$ and orthogonal to the traveling direction of the first atomic beam. In Formula (19), we consider that the effective wave number vector $k_{eff}$ and the traveling direction of the first atomic beam are orthogonal to each other.

$$|\Omega_z| = \frac{\delta_1}{|k_{eff}|L} \quad (19)$$

From the previous description, it can be seen that it is possible to detect, by performing adjustment to achieve $\Phi_L=\Phi_R$ under the condition of $\delta_3=-\delta_1$, the z-direction component $|\Omega_z|$ of the angular velocity vector $\Omega$ when an angular velocity is applied to the inertial sensor without being affected by the velocities $|v_L|$ of the atoms in the first atomic beam in the traveling direction of the first atomic beam and the velocities $|v_R|$ of the atoms in the second atomic beam in the traveling direction of the second atomic beam, that is, with avoiding deterioration in the contrast of atom interference which would otherwise arise due to dispersion of velocities, in a traveling direction of an atomic beam, of atoms in the atomic beam.

The adjustment of achieving $\Phi_L=\Phi_R$ under the condition of $\delta_3=-\delta_1$ in the herein-disclosed inertial sensor is usually feedback adjustment. An example of the feedback adjustment of achieving $\Phi_L=\Phi_R$ under the condition of $\delta_3=-\delta_1$ is PID (Proportional-Integral-Differential) adjustment of two-photon detuning $\delta_1$ ($=-\delta_3$) for keeping the difference $\Phi_L-\Phi_R$ of the interferometric phases $\Phi_L$ and $\Phi_R$ constant. The adjustment of the two-photon detuning $\delta$ is implemented, for example, by a frequency shifter which the other laser beam of the pair of counter-propagating laser beams enters. When the frequency shifter is an acousto-optic modulator (AOM), an acoustic signal input to the AOM is adjusted. When the frequency shifter is an electro-optic modulator (EOM), a voltage signal input to the EOM is adjusted.

The above description is extended to a case where M is a predetermined integer satisfying 3≤M. Hereinafter, it is supposed that M moving standing light waves are arranged in ascending order in the traveling direction of one atomic beam in a dual atom interferometer and "i" represents at least one integer out of [M/2] integers satisfying 1≤N≤[M/2]. The square bracket notation [x] represents a floor function, and represents an integer n satisfying n≤x<n+1. The moving standing light wave generation device adjusts a) the two-photon detuning Si of the pair of counter-propagating laser beams corresponding to an i-th moving standing light wave out of the M moving standing light waves and b) the two-photon detuning $\delta_{M-i+1}$ of the pair of counter-propagating laser beams corresponding to an (M−i+1)-th moving standing light wave out of the M moving standing light waves so as to keep constant the difference between the interferometric phase corresponding to one atomic beam obtained by interaction of the first atomic beam with the M moving standing light waves and the interferometric phase corresponding to the other atomic beam obtained by interaction of the second atomic beam with the M moving standing light waves. Note that $\delta i=-\delta_{M-i+1}$ is satisfied. Incidentally, "the interferometric phase corresponding to one (resp. the other) atomic beam" means an interferometric phase derived from atom interference that is raised by split of one (resp. the other) atomic beam and recombination thereof, as already mentioned in association with the term "interferometric phase".

For example, in the case of M=4, for keeping constant the difference between the interferometric phase corresponding to one atomic beam obtained by interaction of the first atomic beam with the M moving standing light waves and the interferometric phase corresponding to the other atomic beam obtained by interaction of the second atomic beam with the M moving standing light waves, (1) the two-photon detuning $\delta_1$ of the first moving standing light wave and the two-photon detuning $\delta_4$ of a fourth moving standing light wave may be adjusted (in this case, $\delta_1=-\delta_4$ is satisfied), or (2) the two-photon detuning $\delta_2$ of the second moving standing light wave and the two-photon detuning $\delta_3$ of the third moving standing light wave may be adjusted (in this case, $\delta_2=-\delta_3$ is satisfied), or (3) the two-photon detuning $\delta_1$ of the first moving standing light wave, the two-photon detuning $\delta_2$ of the second moving standing light wave, the two-photon detuning $\delta_3$ of the third moving standing light wave, and the two-photon detuning $\delta_4$ of the fourth moving standing light wave may be adjusted (in this case, both $\delta_1=-\delta_4$ and $\delta_2=-\delta_3$ are satisfied).

For example, in the case of M=5, for keeping constant the difference between the interferometric phase corresponding to one atomic beam obtained by interaction of the first atomic beam with the M moving standing light waves and the interferometric phase corresponding to the other atomic beam obtained by interaction of the second atomic beam with the M moving standing light waves, (1) the two-photon detuning $\delta_1$ of the first moving standing light wave and the two-photon detuning $\delta_5$ of a fifth moving standing light wave may be adjusted (in this case, $\delta_1=-\delta_5$ is satisfied), or (2) the two-photon detuning $\delta_2$ of the second moving standing light wave and the two-photon detuning $\delta_4$ of the fourth moving standing light wave may be adjusted (in this case, $\delta_2=-\delta_4$ is satisfied), or (3) the two-photon detuning $\delta_1$ of the first moving standing light wave, the two-photon detuning $\delta_2$ of the second moving standing light wave, and the two-photon detuning $\delta_4$ of the fourth moving standing light wave, and the two-photon detuning $\delta_5$ of the fifth moving standing light wave may be adjusted (in this case, both $\delta_1=-\delta_5$ and $\delta_2=-\delta_4$ are satisfied).

In the description up to here, the second and third terms in the second equation of Formula (13) are ignored by assuming that the magnitude of the acceleration vector a and the two-photon detuning $\delta_2$ are sufficiently small. However, in the following description, a case in which such an assumption is not established will be considered.

When $L_{det,L}=L_{det,R}=L_{det}$ are satisfied and the distribution of the velocities $|v_L|$ of atoms in the first atomic beam in the traveling direction of the first atomic beam is equal to the distribution of the velocities $|v_R|$ of atoms in the second atomic beam in the traveling direction of the second atomic beam (that is, from a statistical point of view, we can recognize that $v_L=v$ and $v_R=-v$ are satisfied), the second equation of Formula (13) and the second equation of Formula (17) can be expressed by Formula (20) and Formula (21), respectively.

$$\Phi_L = (\delta_1 + \delta_3)\left(t - \frac{L_{det}}{|v|}\right) + 2\delta_2 \frac{L+L_{det}}{|v|} + \quad (20)$$

$$k_{eff} \cdot a\left(\frac{L}{|v|}\right)^2 - 2\left(\delta_1 - k_{eff} \cdot \left(\Omega \times \frac{v}{|v|}\right)L\right)\frac{L}{|v|} + \phi_1 - 2\phi_2 + \phi_3 - 2\delta_2 t$$

-continued $$\Phi_R = (\delta_1 + \delta_3)\left(t - \frac{L_{det}}{|v|}\right) + 2\delta_2\frac{L + L_{det}}{|v|} + k_{eff} \cdot a\left(\frac{L}{|v|}\right)^2 + \quad (21)$$

$$2\left(-\delta_3 - k_{eff} \cdot \left(\Omega \times \frac{v}{|v|}\right)L\right)\frac{L}{|v|} + \phi_1 - 2\phi_2 + \phi_3 - 2\delta_2 t$$

As is clear from Formulas (20) and (21), when $\delta_3 = -\delta_1$ and Formula (15) are satisfied, $\Phi_L - \Phi_R = 0$ holds. Altogether, when $L_{det,L} = L_{det,R}$ are satisfied and it can be recognized that $v_L = v$ and $v_R = -v$ are satisfied from a statistical point of view, it is possible to detect the z-direction component $|\Omega_z|$ of the angular velocity vector $\Omega$ independently of the velocities $|v_L|(=|v|)$ of the atoms in the first atomic beam in the traveling direction of the first atomic beam and the velocities $|v_R|(=|v|)$ of the atoms in the second atomic beam in the traveling direction of the second atomic beam, because the effects on $\Phi_L$ and $\Phi_R$ from velocities appearing jointly with the acceleration vector a and the two-photon detuning $\delta_2$ are common-mode canceled by performing adjustment to achieve $\Phi_L = \Phi_R$ under the condition of $\delta_3 = -\delta_1$. However, the second and third terms in Formula (20) contribute to deterioration in the contrast of one atom interference itself and the second and third terms in Formula (21) contribute to deterioration in the contrast of the other atom interference itself. In other words, when acceleration is applied to the inertial sensor, the deterioration in the contrast of atom interference due to dispersion of velocities of atoms in the traveling direction of the atomic beam arises in each atom interference. There will be described a method for suppressing deterioration in the contrast of atom interference that arises due to dispersion of velocities, in the traveling direction of the atomic beam, of atoms in the atomic beam when acceleration is applied to the inertial sensor.

When acceleration is applied to the atom interferometer, as is clear from Formulas (20) and (21), it can be seen that it is impossible to completely eliminate the influence of the atom velocity on the interferometric phase because the interferometric phase involves the inverse square of the atom velocity and the inverse of the atom velocity. Therefore, we consider reducing, not eliminating, the influence of the atom velocity on the interferometric phase.

Physical quantities that can be practically adjusted in Formulas (20) and (21) are the two-photon detuning $\delta_1$, $\delta_2$, and $\delta_3$, but as mentioned above, $\delta_1$ and $\delta_3$ are adjusted to cancel the effect on the interferometric phase from the inverse of the atom velocity appearing jointly with the angular velocity. Therefore, we consider adjusting the two-photon detuning $\delta_2$. Specifically, $\delta_2$ is adjusted so as to satisfy Formula (22) where $v_0$ represents the mode or average value of the distribution of velocities of atoms described above. It is possible to know $v_0$ in advance by calculating or measuring the velocity distribution.

$$2\delta_2\frac{L + L_{det}}{v_0} + k_{eff} \cdot a\left(\frac{L}{v_0}\right)^2 = 0 \quad (22)$$

Under the adjustment of $\delta_2$ which satisfies Formula (22), the influence of the atom velocity $v_0 + \Delta v$ in the traveling direction of the atomic beam on each of the interferometric phases $\Phi_L$ and $\Phi_R$ is expressed by Formula (23). Here, $-v_0 \leq \Delta v$.

$$2\delta_2\frac{L + L_{det}}{v_0 + \Delta v} + k_{eff} \cdot a\left(\frac{L}{v_0 + \Delta v}\right)^2 = \quad (23)$$

$$-k_{eff} \cdot a\left(\frac{L}{v_0}\right)^2 \frac{v_0}{L + L_{det}} \frac{L + L_{det}}{v_0 + \Delta v} + k_{eff} \cdot a\left(\frac{L}{v_0 + \Delta v}\right)^2 =$$

$$-k_{eff} \cdot a\frac{L^2}{v_0^2}\left\{\frac{v_0 \Delta v}{(v_0 + \Delta v)^2}\right\}$$

Therefore, reduction in the influence of the atom velocity $v_0 + \Delta v$ on each of the interferometric phases $\Phi_L$ and $\Phi_R$ by adjusting $\delta_2$ which satisfies the formula (22) is expressed by Formula (24).

$$\frac{\left|-k_{eff} \cdot a\frac{L^2}{v_0^2}\left\{\frac{v_0 \Delta v}{(v_0 + \Delta v)^2}\right\}\right|}{\left|k_{eff} \cdot a\frac{L^2}{(v_0 + \Delta v)^2}\right|} = \frac{|\Delta v|}{v_0} \quad (24)$$

Whether the atomic beam is a thermal atomic beam or a cold atomic beam, $|\Delta v| < v_0$ is satisfied in the above-mentioned velocity range including $v_0$, so that $|\Delta v|/v_0 < 1$ is satisfied in Formula (24). In other words, it is possible to reduce the effect on the interferometric phase $\Phi$ from the atom velocity attendant on acceleration by adjusting the two-photon detuning $\delta_2$ such that Formula (22) is satisfied. Examples of the feedback adjustment of the two-photon detuning $\delta_2$ which satisfies Formula (22) include adjusting an extremum of the two-photon detuning $\delta_2$ with a perturbation method, specifically, adjusting the extremum of the $\delta_2$ such that $\eta(\delta_2) > \eta(\delta_2 \pm \Delta)$ is satisfied for a minute change of $\delta_2$ (that is, $\delta_2 \pm \Delta$), where $\eta(\delta_2)$ is a function of $\delta_2$ to represent the contrast.

In short, when an angular velocity and acceleration are applied to the atom interferometer, it is possible to eliminate (ideally, completely) the effects on each of the interferometric phases $\Phi_L$ and $\Phi_R$ from the atom velocities attendant on an angular velocity by performing adjustment of achieving $\Phi_L = \Phi_R$ under the condition of $\delta_3 = -\delta_1$, and it is possible to reduce the effects on each of the interferometric phases $\Phi_L$ and $\Phi_R$ from the atom velocities attendant on acceleration by adjusting the two-photon detuning $\delta_2$ such that Formula (22) is satisfied.

Embodiments

An embodiment of the inertial sensor disclosed herein will be described with reference to the drawings. Note that figures are for understanding of the embodiment, and the dimensions of respective illustrated components are not necessarily accurate.

Figure 4:
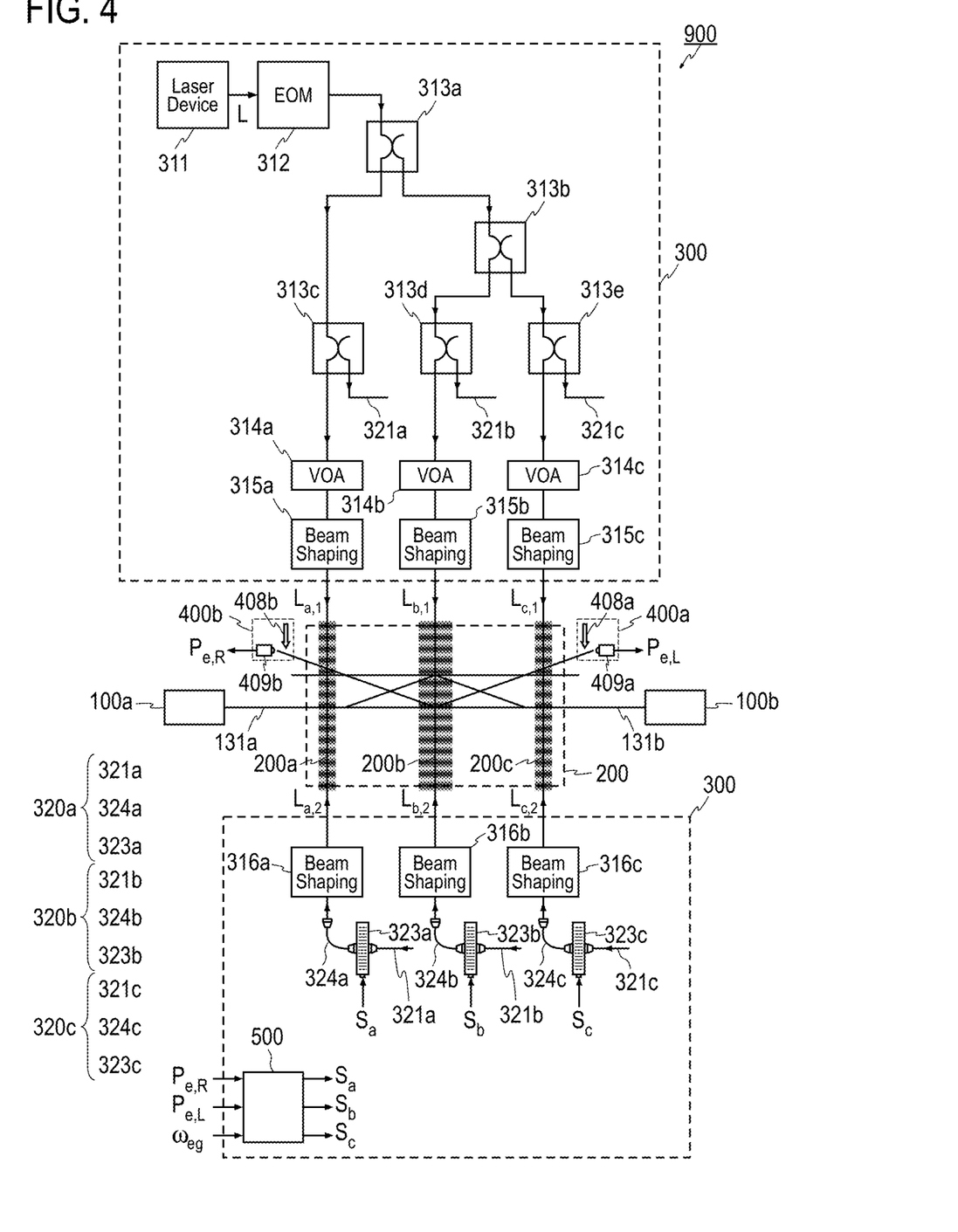
FIG. 4 shows a schematic configuration of a non-limited embodiment of the herein-disclosed inertial sensor.
Figure 5A:
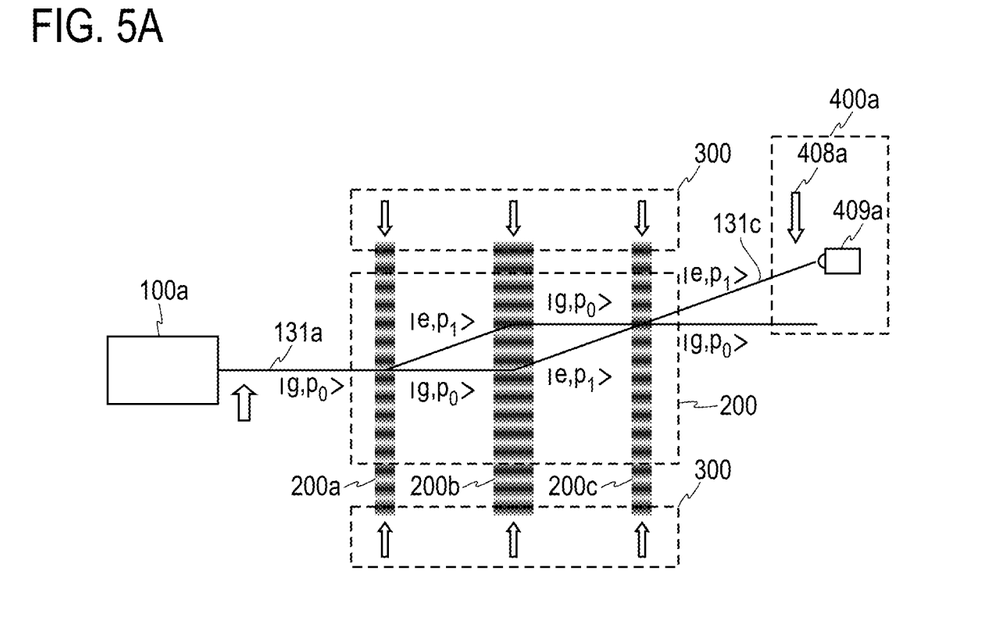
FIG. 5A shows a part of the schematic configuration shown in FIG. 4, which illustrates an atom interference using a first atomic beam.
Figure 5B:
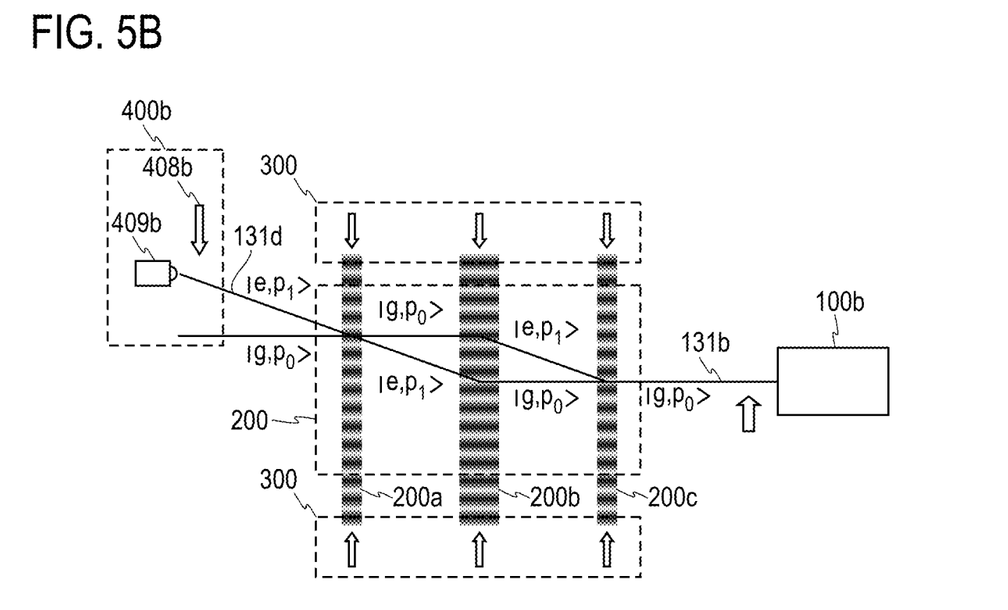
FIG. 5B shows a part of the schematic configuration shown in FIG. 4, which illustrates another atom interference using a second atomic beam.

The embodiment of the inertial sensor disclosed herein will be described. An inertial sensor 900 (see FIGS. 4 and 5) utilizing Mach-Zehnder type atom interference includes: a first atomic beam generation device 100a for continuously generating a first atomic beam 131a; a second atomic beam generation device 100b for continuously generating a second atomic beam 131b; the moving standing light wave generation device 300 for generating three moving standing light waves; an interference device 200 for making the first atomic beam 131a and the second atomic beam 131b going therein while traveling toward each other interfere with the three moving standing light waves to produce a) a third atomic beam 131c as a result of the interaction between the first atomic beam 131a and the three moving standing light waves and b) a fourth atomic beam 131d as a result of the interaction between the second atomic beam 131b and the three moving standing light waves; a first observation device 400a for observing the third atomic beam 131c; and a second observation device 400b for observing the fourth atomic beam 131d. In the present embodiment, the first atomic beam generation device 100a, the second atomic beam generation device 100b, the interference device 200, the first observation device 400a, and the second observation device 400b are accommodated in a vacuum chamber (not shown).

[Atomic Beam Generation Device]

The configurations of the first atomic beam generation device 100a and the second atomic beam generation device 100b will be described. The configuration of the first atomic beam generation device 100a does not need to be the same as the configuration of the second atomic beam generation device 100b. Further, there is no limitation to the configuration that can be adopted as the first atomic beam generation device 100a or the second atomic beam generation device 100b. Therefore, in the present disclosure, an example of a configuration of an atomic beam generation device 100x (x∈{a, b}) will be described without distinguishing the first atomic beam generation device 100a and the second atomic beam generation device 100b from each other.

Figure 6A:
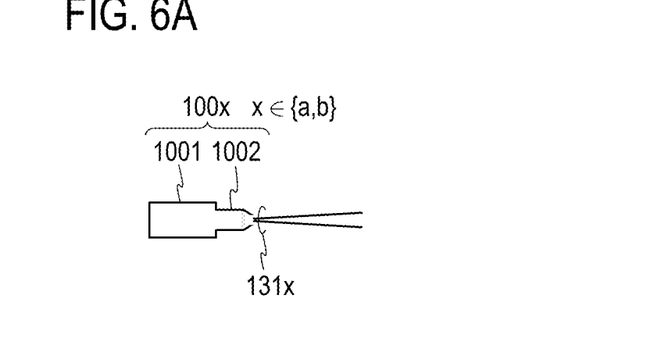
FIG. 6A shows a schematic configuration of an atomic beam generation device for generating a thermal atomic beam.

The atomic beam generation device 100x (x∈{a, b}) for continuously generating a thermal atomic beam has, for example, a configuration including a heater 1001 and a nozzle 1002 communicating with the heater 1001 (see FIG. 6A). The heater 1001 generates gaseous atoms by heating a solid of high purity consisting of a single element. The gaseous atoms obtained by the heater 1001 emit as a thermal atomic beam from the heated nozzle 1002 to the outside of the atomic beam generation device 100x (x∈{a, b}). See FIG. 1 of Reference Literature 1 as an example of the configuration of such an atomic beam generation device 100x (x∈{a, b}).

(Reference Literature 1) Cvejanovic D and Murray A J, "Design and characterization of an atomic beam oven for combined laser and electron impact experiments," Meas. Sci. Tech. 13 1482-1487 (2002).

The traveling direction of the thermal atomic beam is a direction in which a line obtained by connecting the peaks of the density distribution of atoms in the thermal atomic beam extends, and it usually matches a jetting direction of the nozzle 1002 (that is, a direction in which the central axis of the nozzle 1002 extends). The average velocity of the atoms in the thermal atomic beam in the traveling direction of the thermal atomic beam is approximately several hundreds m/s (Rb: ~300 m/s, Yb: ~300 m/s, Ca: ~600 m/s). The distribution of velocities of the atoms in the thermal atomic beam in the traveling direction of the thermal atomic beam conforms to the Maxwell-Boltzmann distribution.

Figure 6B:
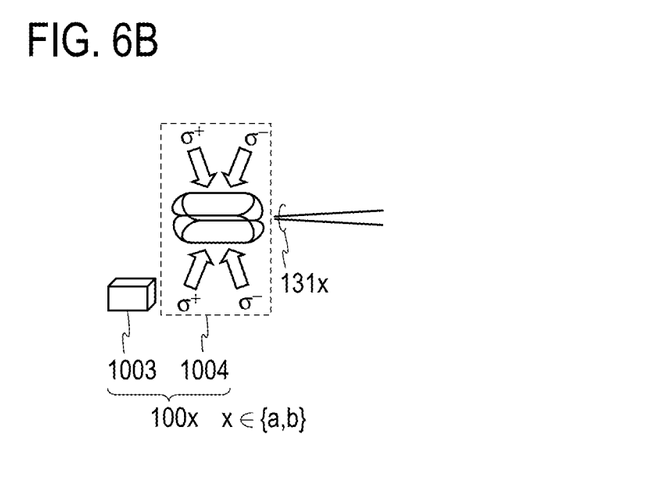
FIG. 6B shows a schematic configuration of an atomic beam generation device for generating a cold atomic beam.

The atomic beam generation device 100x (x∈{a, b}) for continuously generating a cold atomic beam has a configuration including, for example, a gaseous atom generator 1003 and a laser cooler 1004 (see FIG. 6B).

The gaseous atom generator 1003 has a configuration in which a solid sublimates or a liquid evaporates or volatilizes, and generates gaseous atoms. The solid or liquid of high purity preferably consists of a single element. When using strontium, calcium, or the like, the heater 1001 is required, but when using rubidium, cesium, or the like, the saturated vapor pressure at room temperature (that is, temperature suitable for human activities) is high (in other words, vaporization is easy), so that sufficient gaseous atoms can be obtained without using the heater 1001. Gaseous atoms (hereinafter simply referred to as atoms) filled in one section of the vacuum chamber are naturally supplied to the laser cooler 1004.

The laser cooler 1004 includes, for example, a two-dimensional magneto-optical trap (2D-MOT) mechanism including a coil for generating a magnetic field, called hairpin wires, and two pairs of cooling laser beams; a 2D$^+$-MOT having a configuration in which one pair of laser beams along a zero magnetic field line of two-dimensional quadrupole magnetic field is added to the 2D-MOT mechanism; a three-dimensional magneto-optical trap (3D-MOT) mechanism configured by a coil (for example, Ioffe coils) for forming two-dimensional quadrupole magnetic field, and three pairs of laser beams arranged along three symmetry axes of two-dimensional quadrupole magnetic field; or a configuration including a combination of these above mechanisms. The laser cooler 1004 may include a Zeeman decelerator if necessary. Alternatively, the mechanism disclosed in Reference Literature 2 is employed as the laser cooler 1004. The laser cooler 1004 generates a cold atomic beam from a cold atom cluster which has been trapped in space.

(Reference Literature 2) Japanese Patent Application Laid-Open No. 2020-020636.

The traveling direction of the cold atomic beam is a direction in which a line obtained by connecting the peaks of the density distribution of atoms in the cold atomic beam extends. The average velocity of the atoms in the cold atomic beam in the traveling direction of the cold atomic beam is approximately several tens m/s. In the case of the cold atomic beam, the distribution of atom velocities in the traveling direction of the cold atomic beam generally has a width of about 20% of the mode.

The atoms in the first atomic beam 131a are set to the same energy level (in this example, the energy level of the state |g>) by optical pumping, and the atom in the second atomic beam 131b are also set to the same energy level (in this example, the energy level of the state |g>) by optical pumping. The first atomic beam 131a and the second atomic beam 131b travel toward each other, and enter the interference device 200. In the interference device 200, the first atomic beam 131a passes through a first moving standing light wave ($\pi/2$ pulse) 200a, a second moving standing light wave ($\pi$ pulse) 200b, and a third moving standing light wave ($\pi/2$ pulse) 200c in this order, and the second atomic beam 131b passes through the third moving standing light wave 200c, the second moving standing light wave 200b, and the first moving standing light wave 200a in this order. In the interference device 200, the first atomic beam 131a interacts with the three moving standing light waves 200a, 200b, 200c to obtain the third atomic beam 131c, and the second atomic beam 131b interacts with the three moving standing light waves 200a, 200b, 200c to obtain the fourth atomic beam 131d.

[Moving Standing Light Wave Generation Device]

An example of the optical configuration (see FIG. 4) of the moving standing light wave generation device 300 for generating the three moving standing light waves 200a, 200b, and 200c will be described.

The moving standing light wave generation device 300 includes three optical modulation devices 320a, 320b, 320c corresponding to the three moving standing light waves 200a, 200b, 200c. The optical modulation device 320x (x∈{a, b, c}) includes optical fibers 321x, 324x through which a laser beam propagates, and a frequency shifter 323x that is connected to the optical fibers 321x, 324x and shifts the frequency of the laser beam. The frequency shifter 323x is not limited to a specific one, but it is, for example, an AOM or an EOM. Hereinafter, the frequency shifter $323x$ is an AOM.

A laser beam L from a laser light source 311 is frequency-shifted by only a predetermined frequency while passing through an EOM 312. The frequency-shifted laser beam L is divided by an optical fiber coupler 313a. One of two laser beams L output from the optical fiber coupler 313a is equally divided by an optical fiber coupler 313c, and the other of the two laser beams L output from the optical fiber coupler 313a is divided by an optical fiber coupler 313b. One of two laser beams L output from the optical fiber coupler 313b is equally divided by an optical fiber coupler 313d, and the other of the two laser beams L output from the optical fiber coupler 313b is equally divided by an optical fiber coupler 313e.

One of two laser beams L output from the optical fiber coupler 313c is attenuated by a variable optical attenuator (VOA) 314a, and further shaped into a desired beam $L_{a,1}$ (for example, a circularly polarized Gaussian beam $\sigma_a^+$) by a beam shaper 315a which is configured, for example, by a lens, a collimator, etc. The thus-obtained beam $L_{a,1}$ enters the interference device 200. The other of the two laser beams L output from the optical fiber coupler 313c is guided to an AOM 323a without crossing the atomic beams by an optical fiber 321a whose one end is connected to the optical fiber coupler 313c by an optical connector (not shown). In FIG. 4, illustration of an intermediate portion of the optical fiber 321a is omitted for ease of viewing.

One of two laser beams L output from the optical fiber coupler 313d is attenuated by a VOA 314b, and further shaped into a desired beam $L_{b,1}$ (for example, a circularly polarized Gaussian beam $\sigma_b^+$) by a beam shaper 315b which is configured, for example, by a lens, a collimator, etc. The thus-obtained beam $L_{b,1}$ enters the interference device 200. The other of the two laser beams L output from the optical fiber coupler 313d is guided to an AOM 323b without crossing the atomic beams by an optical fiber 321b whose one end is connected to the optical fiber coupler 313d by an optical connector (not shown). In FIG. 4, illustration of an intermediate portion of the optical fiber 321b is omitted for ease of viewing.

One of two laser beams L output from the optical fiber coupler 313e is attenuated by a VOA 314c, and further shaped into a desired beam $L_{c,1}$ (for example, a circularly polarized Gaussian beam $\sigma_c+$) by a beam shaper 315c which is configured, for example, by a lens, a collimator, etc. The thus-obtained beam $L_{c,1}$ enters the interference device 200. The other of the two laser beams L output from the optical fiber coupler 313e is guided to an AOM 323c without crossing the atomic beams by an optical fiber 321c whose one end is connected to the optical fiber coupler 313e by an optical connector (not shown). In FIG. 4, illustration of an intermediate portion of the optical fiber 321c is omitted for ease of viewing.

The other end of the optical fiber $321x$ ($x\in\{a, b, c\}$) is connected to the AOM $323x$ by an optical connector, and the laser beam L enters the AOM $323x$. The frequency of laser beam L is shifted by the AOM $323x$. The amount of shift is determined by a frequency $f_x$ of a signal input to the AOM $323x$. An acoustic signal $S_x$ having the frequency $f_x$ is generated by an adjuster 500 described later. As a result, the laser beam L is frequency-modulated. One end of the optical fiber $324x$ is connected to the AOM $323x$ by an optical connector, and a laser beam L output from the AOM $323x$ enters the optical fiber $324x$. The laser beam L comes out from an optical connector attached to the other end of the optical fiber $324x$, and is shaped into a desired beam $L_{x,2}$ (for example, a circularly polarized Gaussian beam $\delta_x^+$) by a beam shaper $316x$ which is configured, for example, by a lens, a collimator, etc. The thus-obtained beam $L_{x,2}$ enters the interference device 200.

As a result, the laser beam $L_{x,1}$ that has not passed through the optical modulation device $320x$ and the laser beam $L_{x,2}$ that has passed through the optical modulation device $320x$ counter-propagate in free space, thereby obtaining a moving standing light wave $200x$ ($x\in\{a, b, c\}$).

[Interference Device]

As described above, the atom interference system in the interference device 200 utilizes the transition between two levels of an atom caused by light irradiation. Therefore, from the viewpoint of avoiding decoherence caused by spontaneous emission, a long-lived transition between two levels is generally used. For example, when the atomic beam is an alkali metal atomic beam, stimulated Raman transition between two levels included in a hyperfine structure of the ground state is utilized. In the hyperfine structure, the state of the lowest energy level is represented by |g>, and the state of an energy level higher than |g> is represented by |e>. As mentioned above, the stimulated Raman transition between two levels is caused by a moving standing light wave formed by counter-propagation of a pair of laser beams whose difference frequency is approximately equal to the resonant frequency between the states |g> and |e>.

Atomic interference using a two-photon Raman process by moving standing light waves will be described below. The interaction between the first atomic beam 131a and the three moving standing light waves will be described; however, except for a case where the second atomic beam 131b is referred to, the description on the interaction between the second atomic beam 131b and the three moving standing light waves would be obtained by merely replacing the terms of "first atomic beam 131a", "first moving standing light wave 200a", "third moving standing light wave 200c", and "third atomic beam 131c" with the terms of "second atomic beam 131b", "third moving standing light wave 200c", "first moving standing light wave 200a", and "fourth atomic beam 131d", respectively.

When the first atomic beam 131a passes through the first moving standing light wave 200a, the state of an individual atom whose initial state is |g, p> changes to a superposition state of |g,p> and |e,p+ℏ$^-$k$_{\it eff}$> (in FIG. 5, $p_0$=p, $p_1$=p+ℏ$^-$k$_{\it eff}$). Immediately after the first atomic beam 131a passes through the first moving standing light wave 200a, the ratio of the population of |g,p> to the population of e,p+ℏ$^-$k$_{\it eff}$> is 1:1. The atom gains the momentum of two photons when the atom makes transition from |g,p> to |e,p+ℏ$^-$k$_{\it eff}$> through absorption and emission of two photons traveling in opposite directions. Therefore, the moving direction of atoms in the state |e,p+ℏ$^-$k$_{\it eff}$> deviates from the moving direction of atoms in the state |g,p>. In other words, when the first atomic beam 131a passes through the first moving standing light wave 200a, the first atomic beam 131a splits into an atomic beam consisting of atoms in the state |g,p> and an atomic beam consisting of atoms in the state |e,p+ℏ$^-$k$_{\it eff}$> in the ratio of 1:1. The first moving standing light wave 200a has a function as a splitter for the first atomic beam 131a, and a function as a combiner for the second atomic beam 131b as described later.

After the splitting, the atomic beam consisting of the atoms in the state |g,p> and the atomic beam consisting of the atoms in the state |e,p+ℏ$^-$k$_{\it eff}$> pass through the second moving standing light wave 200b. By passing through the second moving standing light wave 200b, the atomic beam consisting of the atoms in the state |g,p> is reversed to an atomic beam consisting of atoms in the state |e,p+h⁻k_eff>, and the atomic beam consisting of the atoms in the state |e,p+h⁻k_eff> is reversed to an atomic beam consisting of atoms in the state |g,p>. In this case, with respect to the former atomic beam, the moving direction of the atoms whose states have made transition from |g,p> to |e,p+h⁻k_eff> is deviated from the moving direction of the atoms in the state |g,p> as described above. As a result, the traveling direction of the atomic beam consisting of atoms in the state |e,p+h⁻k_eff> after passing through the second moving standing light wave 200b is parallel to the traveling direction of the atomic beam consisting of atoms in the state |e,p+h⁻k_eff> after passing through the first moving standing light wave 200a. Further, with respect to the latter atomic beam, an atom loses the same momentum as gained from two photons when the atom makes transition from |e,p+h⁻k_eff> to |g,p> through absorption and emission of two photons traveling in opposite directions. In other words, the moving direction of the atoms whose states have made transition from |e,p+h⁻k_eff> to |g,p> deviates from the moving direction of the atoms in the state |e,p+h⁻k_eff> before the transition. As a result, the traveling direction of the atomic beam consisting of the atoms in the state |g,p> after passing through the second moving standing light wave 200b is parallel to the traveling direction of the atomic beam consisting of the atoms in the state |g,p> after passing through the first moving standing light wave 200a. The second moving standing light wave 200b functions as a mirror for the atomic beams.

After the reverse, the atomic beam consisting of the atoms in the state |g,p> and the atomic beam consisting of the atoms in the state |e,p+h⁻k_eff> pass through the third moving standing light wave 200c. Atomic beams are obtained in the interference device 200 which correspond to the superposition state of the states |g,p> and |e,p+h⁻k_eff> of atoms in an intersection region where the atomic beam consisting of the atoms in the state |g,p> and the atomic beam consisting of the atoms in the state |e,p+h⁻k_eff> intersect each other. One of the thus-obtained atomic beams is the third atomic beam 131c. The third moving standing light wave 200c has a function as a combiner for the first atomic beam 131a, and also has a function as the aforementioned splitter for the second atomic beam 131b.

Next, the first observation device 400a and the second observation device 400b will be described. The configuration of the first observation device 400a does not need to be the same as the configuration of the second observation device 400b. Furthermore, there are no limitation to the configuration that can be adopted as the first observation device 400a or the second observation device 400b. Accordingly, only the first observation device 400a will be described here. The description on the second observation device 400b is obtained by merely replacing the terms of "third atomic beam 131c", "probe light 408a", "photodetector 409a", and "third traveling light standing wave 200c" in the following description on the first observation device 400a with the terms of "fourth atomic beam 131d", "probe light 408b", "photodetector 409b", and "first moving standing light wave 200a", respectively. The first observation device 400a irradiates with probe light 408a the third atomic beam 131c come from the interference device 200, and detects, for example, fluorescence from atoms in the state |e,p+h⁻k_eff> using the photodetector 409a. A detection signal from the photodetector 409a represents the population of the atoms in the state |e,p+h⁻k_eff>. Examples of the photodetector 409a include a photomultiplier tube, a fluorescence photodetector, and the like. Alternatively, when a channeltron is used as the photodetector 409a, the atomic beam on one of the two paths after passing through the third traveling light standing wave 200c may be ionized by a laser or the like instead of the probe light, and then ions may be detected by the channeltron.

Figure 7:
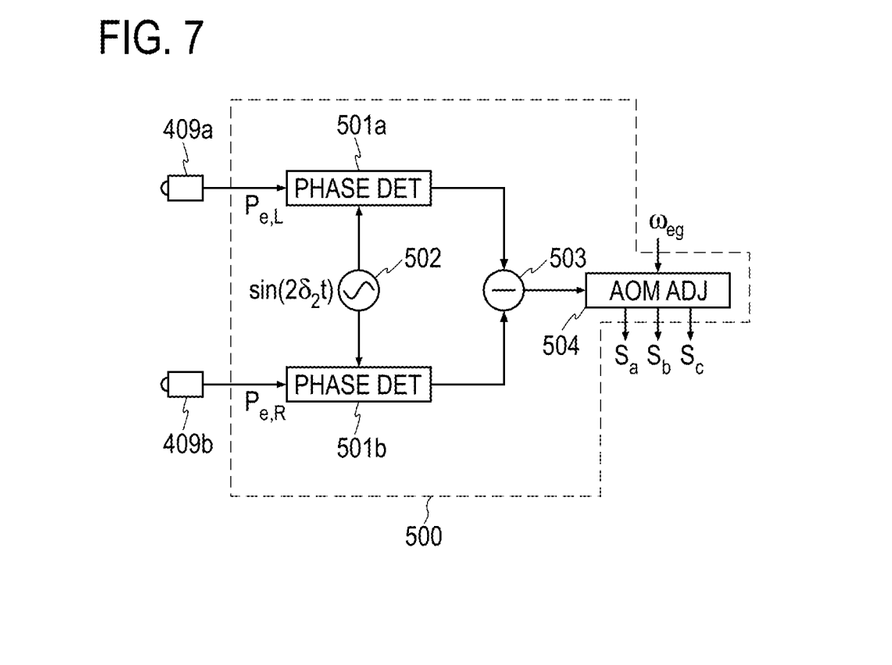
FIG. 7 shows a schematic configuration of an adjuster.

The controller 500 will be described with reference to FIG. 7. The controller 500 in the inertial sensor 900 of the present embodiment includes a first phase detector 501a, a second phase detector 501b, a reference signal generator 502, a phase difference detector 503, and an AOM controller 504.

The first phase detector 501a includes a high-pass filter (not shown), a multiplier (not shown), and a low-pass filter (not shown). The high-pass filter of the first phase detector 501a removes a DC component from a detection signal representing the population of atoms in the state |e,p+h⁻k_eff> observed by the photodetector 409a. The multiplier of the first phase detector 501a multiplies the output signal of the high-pass filter of the first phase detector 501a by a reference signal $\sin(2\delta_2 t)$ generated by the reference signal generator 502. The low-pass filter of the first phase detector 501a extracts a DC component of the output signal of the multiplier of the first phase detector 501a.

The second phase detector 501b includes a high-pass filter (not shown), a multiplier (not shown), and a low-pass filter (not shown). The high-pass filter of the second phase detector 501b removes a DC component from a detection signal representing the population of atoms in the state |e,p+h⁻k_eff> observed by the photodetector 409b. The multiplier of the second phase detector 501b multiplies the output signal of the high-pass filter of the second phase detector 501b by the reference signal $\sin(2\delta_2 t)$ generated by the reference signal generator 502. The low-pass filter of the second phase detector 501b extracts a DC component of the output signal of the multiplier of the second phase detector 501b.

The phase difference detector 503 obtains a difference signal (that is, phase difference) between the output signal of the first phase detector 501a and the output signal of the second phase detector 501b.

The AOM controller 504 generates an acoustic signal $S_a$ having a frequency $\omega_{eg}+\delta_1$ by using $\delta_1$ when the output signal of the phase difference detector 503 is equal to zero, generates an acoustic signal $S_b$ having a frequency $\omega_{eg}+\delta_2$ by using an angular frequency of the reference signal, and generates an acoustic signal $S_c$ having a frequency $\omega_{eg}-\delta_1$ by using $\delta_1$ when the output signal of the phase difference detector 503 is equal to zero (see Formula (7)). The acoustic signal $S_a$ generated by the AOM controller 504 is supplied to the AOM 323a, the acoustic signal $S_b$ generated by the AOM controller 504 is supplied to the AOM 323b, and the acoustic signal $S_c$ generated by the AOM controller 504 is supplied to the AOM 323c.

A z-direction component $|\Omega_z|$ of an angular velocity vector $\Omega$ is obtained by Formula (19) using $\delta_1$ when the output signal of the phase difference detector 503 is equal to zero.

Figure 8:
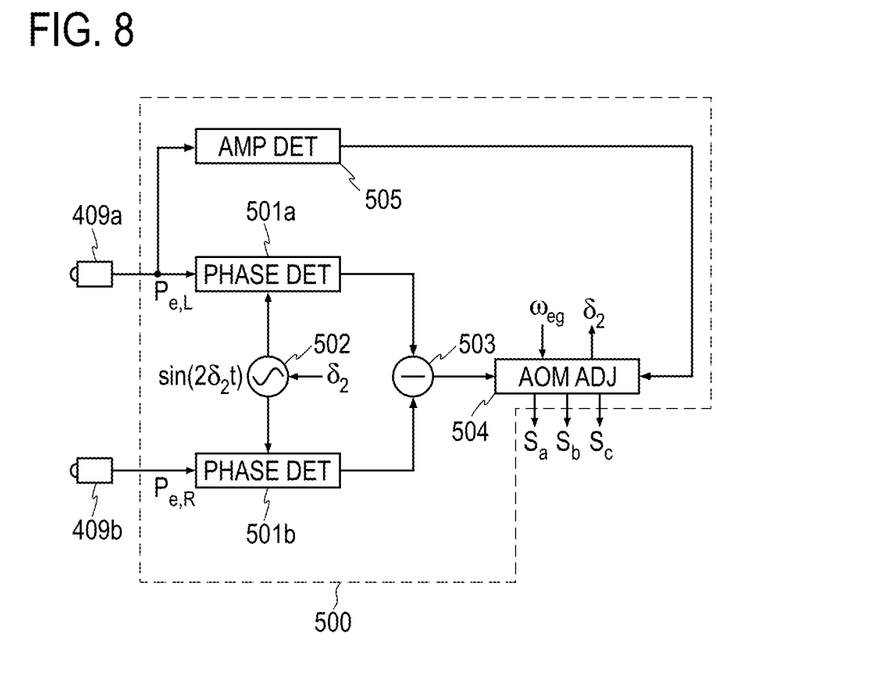
FIG. 8 shows a schematic configuration of the adjuster.

As described above, when $\delta_2$ is controlled so as to satisfy Formula (22), the controller 500 further includes an amplitude detector 505 as shown in FIG. 8. The amplitude detector 505 uses a high-pass filter (not shown) to remove a DC component from the detection signal representing the population of atoms in the state |e,p+h⁻k_eff> observed by the photodetector 409a, and further detects the amplitude of the detection signal from which the DC component has been removed. Note that the amplitude detector 505 may use a high-pass filter (not shown) to remove a DC component from the detection signal representing the population of atoms in the state $|e, p+h^-k_{eff}\rangle$ observed by the photodetector 409b, and further detect the amplitude of the detection signal from which the DC component has been removed.

In addition to the above-mentioned acoustic signals $S_a$ and $S_c$, the AOM controller 504 generates an acoustic signal $S_b$ having a frequency $\omega_{eg}+\delta_2$ by using $\delta_2$ that maintains an extremum of the output signal of the amplitude detector 505 (that is, the amplitude of the population), and further controls the reference signal generator 502 to output the reference signal $\sin(2\delta_2 t)$.

<Modification>

For example, the inertial sensor of the above-mentioned embodiment utilizes Mach-Zehnder type atom interference using three moving standing light waves, but may use Mach-Zehnder type atom interference using four or more moving standing light waves. See Reference Literature 2 for Mach-Zehnder type atom interference using four or more moving standing light waves.

(Reference Literature 2) Takatoshi Aoki et al., "High-finesse atomic multiple-beam interferometer comprised of copropagating stimulated Raman-pulse fields," Phys. Rev. A 63, 063611 (2001)—Published 16 May 2001.

Furthermore, the atom interference used by the inertial sensor is not limited to the Mach-Zehnder type atom interference, but may be, for example, the Ramsey-Bode type atom interference.

Supplement

Although the present invention has been described with reference to illustrative embodiments, a person skilled in the art will appreciate that various changes can be made and elements thereof can be replaced by equivalents without departing from the scope of the invention. Additionally, many modifications may be made to adapt a particular system, device, or component thereof to the teachings of the invention without departing from the essential scope of the present invention. Therefore, the present invention is not limited to the particular embodiments disclosed for carrying out the invention, but is intended to include all embodiments falling within the scope of the appended claims.

Furthermore, except for the ordering of M moving standing light waves, use of terms of "first", "second", etc. does not indicate any order or importance, and the terms of "first", "second", etc. are used to distinguish elements from one another. The terminology used herein is for the purpose of describing the embodiments, and is not intended to limit the present invention in any way. The term of "comprising" and conjugations thereof, when used in the present specification and/or the appended claims, clarify the presence of the features, steps, operations, elements, and/or components mentioned, but do not exclude the presence or addition of one or more other features, steps, operations, elements, components and/or groups thereof. The term of "and/or" includes any and all combinations of one or more of associated listed elements, if any. In the claims and the specification, unless stated otherwise, the words of "connected," "coupled," "joined," "linked," or synonyms thereof, and all word forms thereof, do not necessarily deny the existence of one or more intermediate elements between two elements that are "connected" or "coupled" to each other, or "linked" to each other. In the claims and the specification, the term of "any", if any, is to be understood as having the same meaning as the universal quantifier V, unless stated otherwise. For example, the expression of "for any X" has the same meaning as "for all X" or "for each X". An expression like "at least one of A, B, and C" (for example, expressions such as "at least one of A, B and C", "at least one of A, B or C", "at least one of A, B and/or C") means that any element is selected from a set P obtained by removing an empty set $\phi$ from a power set $2^S$ of a set S containing all listed elements, if any, unless otherwise specified. In this example, $S=\{A, B, C\}$, $2^S=\{\phi, \{A\}, \{B\}, \{C\}, \{A, B\}, \{A, C\}, \{B, C\}, \{A, B, C\}\}$, $P=\{\{A\}, \{B\}, \{C\}, \{A, B\}, \{A, C\}, \{B, C\}, \{A, B, C\}\}$, and this example means that one element (for example, $\{A, C\}$) is arbitrarily selected from the set P.

Unless defined otherwise, all terms (including technical terms and scientific terms) used herein have the same meaning as commonly understood by persons skilled in the art to which the present invention belongs. Further, terms such as those defined in commonly used dictionaries should be construed to have meanings consistent with their meanings in the relevant art and the context of the present disclosure, and unless explicitly defined, they should not be construed ideally or excessively formally.

It will be appreciated that a number of techniques and steps are disclosed in the description of the present invention. These techniques and steps have individual advantages, and each of them can also be used in combination with one or more, or even all, of the other disclosed techniques and steps. Therefore, in order to avoid complication, this specification refrains from describing every possible combination of the individual techniques or steps. Nevertheless, the specification and claims should be read with the understanding that such combinations are fully within the scope of the present invention and the claims.

Structures, materials, acts, and equivalents thereof which correspond to all functional elements coupled with means or steps in the following claims are intended to include structures, materials or acts for performing functions, if any, in combination with other claimed elements.

Although the embodiments of the present invention have been described above, the present invention is not limited to these embodiments. Various changes and modifications may be made without departing from the spirit of the present invention. The embodiments selected and described are for the purpose of illustrating the principle of the present invention and its practical application. The present invention may be used in the form of various embodiments with various changes and modifications, and the various changes and modifications are determined depending on expected applications. All such changes and modifications are intended to be included within the scope of the present invention as prescribed by the appended claims and if interpreted in accordance with the breadth to which they may be fairly, legally and justly entitled; it is intended that the same protection be afforded.

What is claimed is:

1. An inertial sensor comprising:
    a first atomic beam generation device configured to continuously generate a first atomic beam;
    a second atomic beam generation device configured to continuously generate a second atomic beam;
    a moving standing light wave generation device configured to produce M moving standing light waves each generated by a pair of counter-propagating laser beams, the M representing a predetermined integer satisfying $3 \leq M$;
    an interference device configured to make the first atomic beam and the second atomic beam going therein while traveling toward each other interfere with the M moving standing light waves to produce a third atomic beam and a fourth atomic beam, the third atomic beam resulting from interaction of the first atomic beam with the M moving standing light waves, and the fourth atomic beam resulting from interaction of the second atomic beam with the M moving standing light waves;
a first observation device configured to observe the third atomic beam; and
a second observation device configured to observe the fourth atomic beam,
wherein the M moving standing light waves are arranged in parallel to one another along a traveling direction of the first atomic beam, and arranged symmetrically with respect to a straight line orthogonal to the traveling direction of the first atomic beam, and
the moving standing light wave generation device adjusts two-photon detuning $\delta_i$ of the pair of counter-propagating laser beams corresponding to an i-th moving standing light wave out of the M moving standing light waves and two-photon detuning $\delta_{M-i+1}$ of the pair of counter-propagating laser beams corresponding to an (M−i+1)-th moving standing light wave out of the M moving standing light waves such that a difference between an interferometric phase corresponding to the third atomic beam and an interferometric phase corresponding to the fourth atomic beam stays constant, the N representing a predetermined integer satisfying 2≤N<M, the i representing at least one integer among [M/2] integers satisfying 1≤N≤[M/2], the square bracket notation [ ] representing a floor function, and $\delta_i = -\delta_{M-i+1}$ being satisfied.

2. The inertial sensor according to claim 1, wherein
the moving standing light wave generation device adjusts two-photon detuning δ of the pair of counter-propagating laser beams corresponding to at least one of the M moving standing light waves except for the i-th moving standing light wave and the (M−i+1)-th moving standing light wave so as to keep constant an extremum of contrast of the population of the third atomic beam or an extremum of contrast of the population of the fourth atomic beam.

3. The inertial sensor according to claim 2, wherein
a distance between an M-th moving standing light wave out of the M moving standing light waves and the first observation device is equal to a distance between a first moving standing light wave out of the M moving standing light waves and the second observation device, and
a distribution of velocities of atoms in the first atomic beam in the traveling direction of the first atomic beam is the same as a distribution of velocities of atoms in the second atomic beam in the traveling direction of the second atomic beam.

\* \* \* \* \*